US012708812B2

(12) United States Patent
DeNunzio

(10) Patent No.: US 12,708,812 B2
(45) Date of Patent: *Aug. 18, 2026

(54) FIRE PROTECTION DEVICE WITH CONFORMAL COATING

(71) Applicant: Tyco Fire Products LP, Cranston, RI (US)

(72) Inventor: Cassandra Lyn DeNunzio, Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 182 days.

This patent is subject to a terminal disclaimer.

(21) Appl. No.: 18/758,453

(22) Filed: Jun. 28, 2024

(65) Prior Publication Data

US 2024/0350846 A1 Oct. 24, 2024

Related U.S. Application Data

(63) Continuation of application No. 17/250,496, filed as application No. PCT/US2019/039262 on Jun. 26, 2019, now Pat. No. 12,029,930.

(60) Provisional application No. 62/722,473, filed on Aug. 24, 2018.

(51) Int. Cl.
*A62C 37/14* (2006.01)
*A62C 37/36* (2006.01)

(52) U.S. Cl.
CPC .............. *A62C 37/14* (2013.01); *A62C 37/04* (2013.01)

(58) Field of Classification Search
CPC ......... A62C 37/04; A62C 37/08; A62C 37/10; A62C 37/11; A62C 37/14
See application file for complete search history.

(56) References Cited

U.S. PATENT DOCUMENTS

| | | | |
|---|---|---|---|
| 2,245,144 | A | 6/1941 | Griffith |
| 3,863,720 | A | 2/1975 | Young |
| 4,176,719 | A | 12/1979 | Bray |
| 4,298,068 | A | 11/1981 | Bray |
| 4,796,710 | A | 1/1989 | Job |
| 4,938,294 | A | 7/1990 | Mohler et al. |
| 5,106,415 | A | 4/1992 | Davidian |
| 5,372,203 | A | 12/1994 | Galaszewski |
| 5,455,075 | A | 10/1995 | Longo |
| 5,622,225 | A | 4/1997 | Sundholm |

(Continued)

FOREIGN PATENT DOCUMENTS

| | | | |
|---|---|---|---|
| CN | 2204179 | Y | 8/1995 |
| DE | 20 2012 100 623 | U1 | 5/2012 |

(Continued)

OTHER PUBLICATIONS

"Sprinkler System and Water Spray System Devices", UL Product Spec, https://productspec.ul.com/document.php?id=VNIV.GuideInfo, 2018, 8 pages.

(Continued)

*Primary Examiner* — Darren W Gorman

(74) *Attorney, Agent, or Firm* — Foley & Lardner LLP

(57) ABSTRACT

A bursting capsule includes a hollow cavity completely enclosed and delimited by a vessel wall that includes a frangible material, a rupturing fluid disposed in the hollow cavity, an electrical conductor disposed on the vessel wall, and a conformal coating on at least a portion of the electrical conductor.

14 Claims, 4 Drawing Sheets

(56) References Cited

U.S. PATENT DOCUMENTS

| | | | | |
|---|---|---|---|---|
| 5,762,830 | A | 6/1998 | Long et al. | |
| 5,927,890 | A | 7/1999 | Job et al. | |
| 6,491,110 | B2 | 12/2002 | Gil | |
| 6,896,066 | B2 | 5/2005 | Gil | |
| 6,918,545 | B2 * | 7/2005 | Franson | A62C 37/11 239/37 |
| 8,629,688 | B2 | 1/2014 | Chu et al. | |
| 9,539,451 | B1 * | 1/2017 | Walker | B05B 1/326 |
| 9,579,531 | B2 | 2/2017 | Muller et al. | |
| 9,714,180 | B2 | 7/2017 | Mcintyre et al. | |
| 9,889,324 | B2 | 2/2018 | Muller et al. | |
| 12,029,930 | B2 | 7/2024 | Denunzio | |
| 2002/0053440 | A1 | 5/2002 | Gil | |
| 2003/0196821 | A1 | 10/2003 | Kikuchi et al. | |
| 2004/0194976 | A1 | 10/2004 | Kretzschmar | |
| 2007/0240886 | A1 | 10/2007 | Kil et al. | |
| 2012/0075052 | A1 | 3/2012 | Heuer et al. | |
| 2017/0113078 | A1 | 4/2017 | Magnone et al. | |
| 2017/0113081 | A1 | 4/2017 | Müller et al. | |
| 2017/0120090 | A1 | 5/2017 | Magnone et al. | |
| 2017/0144005 | A1 | 5/2017 | Müller et al. | |
| 2017/0304664 | A1 | 10/2017 | Tanklevski et al. | |
| 2018/0361183 | A1 | 12/2018 | Tanklevski et al. | |
| 2019/0083833 | A1 | 3/2019 | Müller et al. | |
| 2020/0129798 | A1 | 4/2020 | Klug et al. | |
| 2020/0197734 | A1 | 6/2020 | Kim | |

FOREIGN PATENT DOCUMENTS

| | | | |
|---|---|---|---|
| RU | 2615954 | C1 | 4/2017 |
| WO | WO-2020/040872 | A1 | 2/2020 |

OTHER PUBLICATIONS

International Search Report and Written Opinion on International Application No. PCT/US2019/039262, mail date Sep. 10, 2019, 8 pages.

JOB Thermal Bulbs, "JOB Thermal Bulbs Product Range" flyer, 6 pages.

Job Thermo Bulbs, Temperature Key and Specs, https://www.job-group.com/en/products/job-thermo-bulbs/, 17 pages.

Machine-generated English translation of Russian Patent No. RU2615954C1, Publication Date Apr. 11, 2017, 19 pages.

Reliable Automatic Sprinkler Co., Inc., "Model F1 and Model F1FR Intermediate Level Sprinklers", Bulletin 170, Feb. 2019, 3 pages.

Tyco Fire & Building Products, "Series ELO-231B—160 K-factor Upright Pendent Sprinklers Standard Response, Standard Coverage", Mar. 2007, 6 pages.

Tyco Fire & Building Products, "Series TY-B—40,80, and 115 K-factor Upright, Pendent, and Recessed Pendent Sprinklers Standard Response, Standard Coverage", Mar. 2007, 8 pages.

Tyco Fire & Building Products, Fire Protection Products Catalog, 2003, 68 pages.

* cited by examiner

FIRE PROTECTION DEVICE WITH CONFORMAL COATING

CROSS-REFERENCE TO RELATED APPLICATIONS

This application is a continuation of U.S. patent application Ser. No. 17/250,496, filed on Jan. 28, 2021, which is a U.S. national stage application of International Patent Application No. PCT/US2019/039262, filed on Jun. 26, 2019, which claims the benefit of U.S. Provisional Application No. 62/722,473, filed Aug. 24, 2018, the complete disclosures of which are incorporated herein by reference in their entirety.

BACKGROUND

Automatic sprinkler systems include a network of pressurized pipes that connect a water source to a plurality of sprinkler heads. In most systems, each of the plurality of sprinkler heads is automatically activated by a thermal release element. For example, the sprinkler can include a bursting capsule positioned between a release valve of the sprinkler head and an external cap of the sprinkler head. The bursting capsule is typically seated against the external cap of the sprinkler head and holds the release valve of the sprinkler head in a closed position. The bursting capsule commonly is filled with a liquid, a gas, or a combination thereof that undergoes thermal expansion when exposed to a thermal trigger. The thermal trigger can be the result of heat from an external source in the environment, e.g., a fire. Thermal expansion of the liquid, gas, or combination thereof breaks the bursting capsule when the temperature meets or exceeds the thermal trigger. The broken bursting capsule falls away from the release valve, causing the release valve to open and the sprinkler head to dispense water over the fire.

Since automatic sprinkler systems are deployed in a variety of environmental conditions, the sprinkler heads must be durable and resistant to corrosion and moisture.

SUMMARY

The present disclosure relates generally to a fire protection system, and more particularly to a fire protection system including thermal release elements, which can be actuated thermally and/or electrically, for permanently-installed firefighting equipment, such as automatic sprinkler systems.

One embodiment provides a bursting capsule which can function as a triggering element in a fire protection device, e.g., a sprinkler head in a sprinkler system. The bursting capsule may also be incorporated as a thermal triggering element in the emergency release valve of a gas container or other similar device. The bursting capsule typically includes a hollow cavity completely enclosed and delimited by a vessel wall and a rupturing fluid disposed in the hollow cavity. The bursting capsule may also include an electrical conductor disposed on an outside surface of the vessel wall and may electrically connect two contact points. The vessel wall is commonly formed from a frangible material, such as glass. In order to enhance the durability and resistance to corrosion and/or moisture of the bursting capsule, the capsule may include a conformal coating disposed on at least a portion of the outside surface of the bursting capsule substantially covering the electrical conductor.

In one embodiment, the fire protection system includes a sprinkler system with a plurality of sprinkler heads, which can be automatically activated, e.g., by a release element actuated thermally and/or by application of an electrical current. The release element can include a bursting capsule positioned between a release valve of a sprinkler head and an external cap of the sprinkler head. The bursting capsule is designed to rupture when the release element is exposed to a predetermined condition, e.g., exposure to a thermal trigger and/or an applied electrical current. The bursting capsule is commonly filled with a rupturing fluid, which may include a rupturing liquid, a gas, or a combination thereof that undergoes rapid thermal expansion when exposed to predetermined thermal conditions or the application of some other triggering condition and results in breakage of the bursting capsule, typically in a manner that ruptures the capsule. The triggering condition may result from the generation of heat on the surface of the bursting capsule through activation of an electrical current through an electrical conductor disposed on the surface of the capsule.

In some embodiments, the bursting capsule may be designed to have a relatively fast actuation time through activation by an electrical current passing through an electrical conductor disposed on the surface of the capsule. As referred to herein, the term “electrical actuation response time” means the length of time required for the bursting capsule to rupture after application of a constant current source of 1.0 amp through an electrical conductor disposed on the surface of the capsule. For some embodiments, it may be advantageous to have an electrical actuation response time of no more than about 10 seconds, no more than about 5 seconds, no more than about 3 seconds, no more than about 2 seconds or no more than about 1 second.

The electrical conductor disposed on an outside surface of the vessel wall is typically formed by depositing an electrically conductive coating, suitably formed from a conductive metal such as silver, copper, gold, aluminum, zinc, nickel, iron and related alloys, e.g., brass alloys and various iron alloys, in a continuous path on the vessel wall. More particularly, in some embodiments, the electrical conductor may include aluminum or an aluminum alloy. In some embodiments, the continuous path is substantially linear. In some embodiments, the continuous path is substantially spiral-wound along a perimeter of the vessel wall.

In addition to a rupturing liquid, a gas bubble may advantageously be disposed in the hollow cavity. This gas bubble may be an air bubble, for example, but may also be a gas that does not promote fire, such as nitrogen and/or carbon dioxide. Such a gas bubble can be used to precisely set the trigger temperature and/or modify the trigger temperature of the bursting capsule.

A rupturing liquid is disposed in the hollow cavity, which, together with the optional small gas bubble, substantially fills the volume of the hollow cavity. This liquid is commonly selected such that it causes the bursting capsule to rupture at a predetermined trigger temperature due to thermal expansion, for example when the capsule is exposed to a predetermined trigger temperature in the range from about 50 to 275° C., or in some embodiments, in the range from about 50 to 150° C. When the trigger temperature is reached or exceeded, the rupturing fluid (rupturing liquid and optional gas bubble) in the bursting capsule rapidly expands and the capsule ruptures, typically shattering the capsule.

The rupturing fluid is commonly selected so that its boiling point occurs at a temperature below the trigger temperature, such that upon reaching or exceeding the trigger temperature but for the presence of the vessel walls, the fluid would take up a much greater volume than the volume of the hollow cavity. This exerts a significant pressure on the vessel walls and upon rupture of the vessel walls, the fluid is typically released in a manner such that it rapidly vaporizes and undergoes a substantial expansion of the material as it transitions to the gas phase. In addition to having a desired target boiling point, the rupturing fluid is suitably a liquid with a high coefficient of expansion and/or low compressibility, which can result in a narrow trigger temperature range. Moreover, such substances can facilitate design of a bursting capsule with a fast triggering time.

The rupturing fluid that is filled in the compartment generally results, upon its being heated and the corresponding thermal expansion, in a shattering of the bursting capsule and, therefore, a triggering action of the thermal triggering device. Typically, triggering liquid is filled into the cavity so that a defined gas bubble (usually air) is present. When the capsule is subject to heating, the gas bubble absorbs the initial thermal expansion of the triggering fluid until a phase transition of the liquid occurs, resulting in an explosive-type expansion that causes the bursting capsule to shatter.

In some embodiments, the conformal coating is configured to provide a substantial degree of protection of the conductive element during exposure to corrosive environments. The bursting capsule is typically designed to retain its function after exposure to common environmental contaminants, such as salt water, moist carbon dioxide-sulfur dioxide air mixtures and moist hydrogen sulfide-air mixtures. In particular, it may be desirable to configure the conformal coating to protect the conductive element from corrosion under the conditions set forth for the 10-day corrosion tests specified in the Underwriters Laboratory 199 Standard, which is incorporated by reference herein in relevant part. In order to accomplish this, the conformal coating often has an average thickness of about 25 μm to 750 μm and more commonly, about 100 μm to 500 μm. In some embodiments, the conformal coating may advantageously be configured to conduct heat, e.g., where the bursting capsule is designed to be actuated by either exposure to predetermined thermal conditions or by passage of an electrical current through the conductive element disposed on the vessel wall. In such embodiments, it may be desirable to use a somewhat thinner conformal coating.

In some embodiments, the conformal coating is a conformal polymer coating, which includes a silicone-based polymer, an acrylic polymer, a polyurethane polymer, an epoxy polymer, a polyester polymer, a polyester urethane polymer, a parylene polymer, a fluoropolymer or a combination thereof. In some embodiments, the conformal coating may comprise a polyurethane polymer. For example, the conformal coating may suitably include a polyester polyurethane polymer and/or an oil-modified polyurethane polymer. In some embodiments, the conformal coating may advantageously be formed solely from a modified polyurethane polymer, such as an oil-modified polyurethane polymer, e.g., HumiSeal 1A27 Aerosol polyurethane conformal coating or HumiSeal 1A33 Aerosol polyurethane conformal coating. In some embodiments, the conformal coating may advantageously be formed solely from a silicone-based polymer, such as an acrylated silicone polymer. In some embodiments, it may be desirable to use a conformal coating which includes two or more of such types of polymers, where the differing polymer types may be present in a single layer as a polymer blend or may be present as two or more layers, e.g., with each layer being comprised of a distinct polymer type.

In some embodiments, the vessel wall may include a frangible material, e.g., vessel wall may be formed from a frangible material, such as where the bursting capsule is a glass bulb.

In some embodiments, the bursting capsule is configured to rupture the vessel wall after the bursting capsule has been at a predetermined trigger temperature for a predetermined response time. The bursting capsule may advantageously be designed to have a predetermined trigger temperature in a range from about 50 to 275 degrees ° C. and, in some instances, in a range from about 50 to 150 degrees ° C. The bursting capsule may be configured to have a predetermined response time of no more than about 250 seconds, no more than about 210 seconds, often no more than about 180 seconds, desirably no more than about 140 seconds and, in some instances, no more than about 30 seconds.

In some embodiments, the electrical conductor has an electrical resistance of no more than about 50 ohms, often no more than about 20 ohms and typically no more than about 10 ohms. For some embodiments, it may be advantageous for the electrical conductor to have an electrical resistance of no more than about 5 ohms, often no more than about 3.5 ohms and, in some instances, no more than about 2 ohms.

In some embodiments the electrical conductor has an electrical resistance, which is not increased by more than a factor of five (5), desirably by more than a factor of two (2) and, in some instances, no more than a factor of 1.3 after exposure to a moist hydrogen sulfide-air mixture pursuant to UL 199 10-day corrosion test conditions.

In some embodiments, the electrical conductor has an electrical resistance, which is not increased by more than a factor of five (5), desirably by more than a factor of two (2) and, in some instances, no more than a factor of 1.3 after exposure to a moist carbon dioxide-sulfur dioxide air mixture pursuant to UL 199 10-day corrosion test conditions.

In some embodiments, the electrical conductor has an electrical resistance, which is not increased by more than a factor of about five (5), desirably by more than a factor of two (2) and, in some instances, no more than a factor of 1.3 after exposure to a 20% salt spray pursuant to UL 199 10-day corrosion test conditions.

In some embodiments, the bursting capsule has an initial predetermined response time at a predetermined trigger temperature. After exposure to a moist carbon dioxide-sulfur dioxide air mixture pursuant to UL 199 10-day corrosion test conditions, the bursting capsule has a response time at the predetermined trigger temperature which is not greater than about a five (5) multiple, desirably not greater than about a two (2) multiple and, in some instances, not greater than about a 1.3 multiple of the initial predetermined response time.

In some embodiments, the bursting capsule has an initial response time at a predetermined trigger temperature. After exposure to a moist hydrogen sulfide-air mixture pursuant to UL 199 10-day corrosion test conditions, the bursting capsule has a response time at the predetermined trigger temperature which is not greater than about a five (5) multiple, desirably not greater than about a two (2) multiple and, in some instances, not greater than about a 1.3 multiple of the initial predetermined response time.

In some embodiments, the bursting capsule has an initial predetermined response time at a predetermined trigger temperature. After exposure to a 20% salt spray pursuant to UL 199 10-day corrosion test conditions, the bursting capsule has a response time at the predetermined trigger temperature which is not greater than about a five (5) multiple, desirably not greater than about a two (2) multiple and, in some instances, not greater than about a 1.3 multiple of the initial predetermined response time.

In some embodiments, the conformal coating is formed by application of a prepolymer as an aerosol formulation. In other instances, the conformal coating may be applied as a prepolymer by dip or immersion coating, and/or be applied by selectively coating of portions of the bursting capsule with a brush, roller or other similar application device.

In some embodiments, the conformal coating is formed from a silicone polymer that is configured to be cured by exposure to air for at least about 24 hours and often at least about 12 hours.

In some embodiments, a fire protection device includes the bursting capsule, e.g., the bursting capsule is part of a sprinkler head or the emergency release valve of a gas container.

In some embodiments, a fire protection system comprising at least one sprinkler head that includes the bursting capsule.

DETAILED DESCRIPTION

Figure 1:
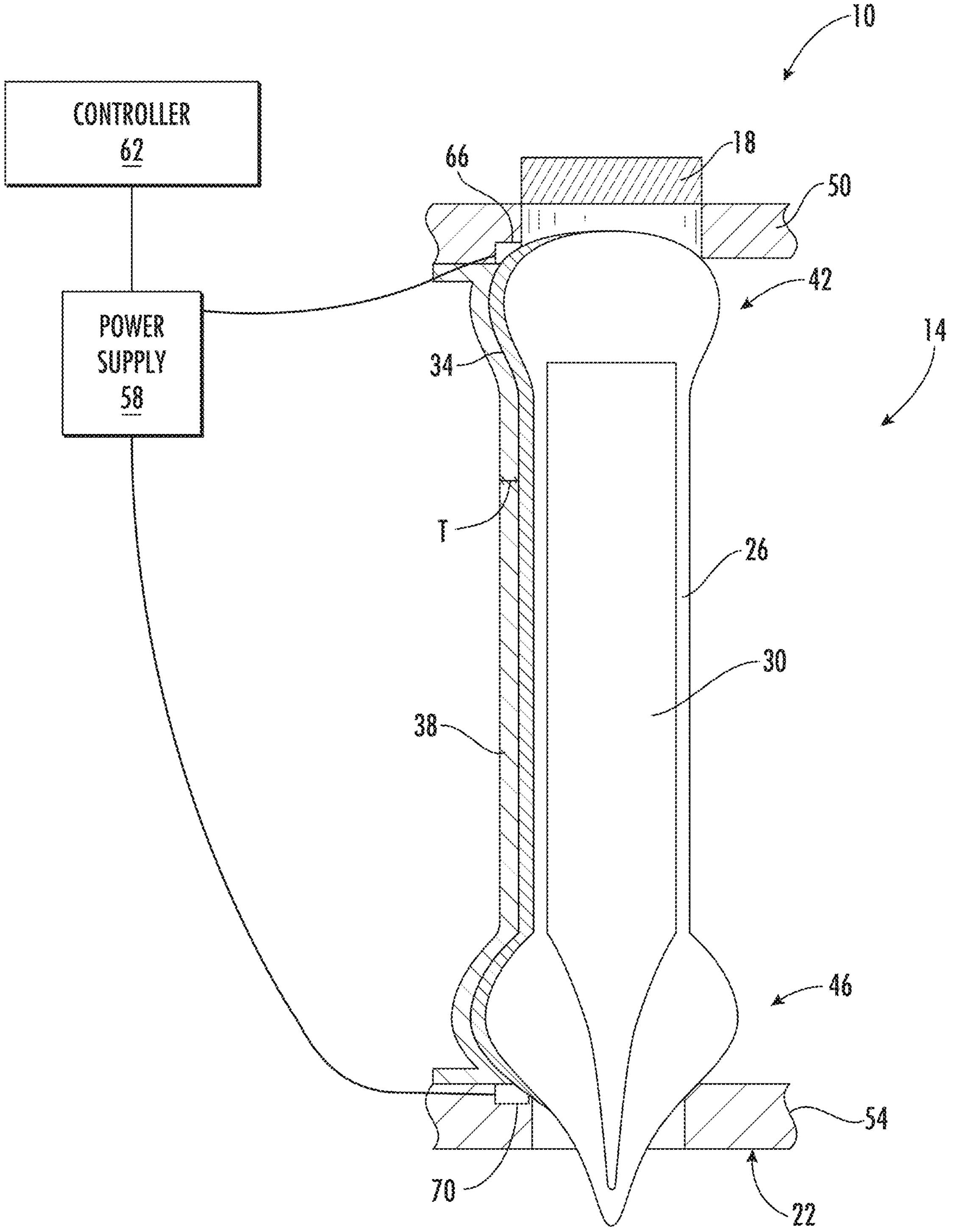
FIG. 1 illustrates a bursting capsule having a conformal coating, according to an example embodiment.

FIG. 1 illustrates a sprinkler head 10 including a bursting capsule 14. The sprinkler head 10 includes a release valve 18 and a cover 22. The release valve 18 is in fluid communication with a pressurized fluid distribution system. For example, the release valve 18 may be in fluid communication with a network of pressurized pipes that connect a water source to a plurality of sprinkler heads 10.

The bursting capsule 14 includes a wall 26 that completely encloses and delimits a hollow cavity 30, a conductive element 34, and a conformal coating 38. In some embodiments, the bursting capsule 14 can be a glass bulb. The bursting capsule 14 is substantially cylindrical in shape and includes a thickened first end 42 and a thickened second end 46. The first end 42 is received within a first support 50 proximate the release valve 18. The second end 46 is received within a second support 54 formed in the cover 22 of the sprinkler head 10 such that the bursting capsule 14 holds the release valve 18 in a closed position.

The wall 26 that encloses the hollow cavity 30 can be made of a frangible material such as glass. The hollow cavity 30 typically contains a rupturing liquid (not shown) and may also contain a gas bubble. The rupturing liquid can undergo thermal expansion due to an increase in temperature of the external environment, as can occur during a fire, or due to an applied current. The applied current can be a constant current. The gas bubble can be an air bubble, for example, but may also be a gas that does not promote fire, such as nitrogen and/or carbon dioxide. The gas bubble can be used to precisely set the trigger temperature and/or modify the trigger temperature of the bursting capsule. The rupturing liquid can be selected so that the thermal expansion of the rupturing fluid can cause the bursting capsule 14 to rupture after the rupturing liquid has been at a predetermined trigger temperature for a predetermined response time. In some embodiments, the predetermined trigger temperature can be in the range from about 50° C. to about 275° C. The predetermined response time is commonly at least about 1 second to avoid instances where rupture of the bursting capsule is accidentally triggered and is generally no more than about 250 seconds. For example, the response time may desirably be 2 seconds, 3 seconds, 5 seconds, 10 seconds, 20 seconds, 50 seconds, 75 seconds, 150 seconds, or 200 seconds. In some embodiments, the response time can be no greater than about 250 seconds. In some embodiments, the predetermined response time can be no more than about 10 seconds and, often no more than about 5 seconds. More particularly, in some embodiments the predetermined response time can be about 2 to 3 seconds. Rupture of the bursting capsule 14 causes the bursting capsule 14 to fall away from the release valve 18 such that the release valve 18 falls into an open position in which water is dispensed from the sprinkler head 10.

In the embodiment illustrated in FIG. 1, the conductive element 34 can be formed by depositing an electrically conductive coating on a portion of the bursting capsule 14 or the conductive element 34 can be adhered to the bursting capsule 14. The conductive element 34 overlies at least a portion of the hollow cavity 30. The conductive element 34 can be electrically connected with at least two contact points on the sprinkler head 10, shown schematically as contact point 66 and contact point 70. In other embodiments, the conductive element 34 can extend through the hollow cavity 30 and the ends 42, 46 of the bursting capsule 14. The conductive element 34 can be connected to a power supply 58, typically through electrical contact between the conductive element 34 and the contact points 66, 70 on the first and second supports 50, 54. The power supply 58 may be in wired or wireless communication with a controller 62, such as a controller of a building management system. In some embodiments, the power supply 58 can include a wired power supply, such as a building electric system. In some embodiments, the power supply 58 can include one or more batteries. The controller 62 can command the power supply 58 to supply an electrical current to the conductive element 34 to cause the bursting capsule 14 to rupture. In some embodiments, the controller 62 can remotely cause the bursting capsule 14 to rupture. In some embodiments, the controller 62 can be proximate and/or integrated with the sprinkler head 10. The electrical current can heat the rupturing fluid in the hollow cavity 30 to the predetermined trigger temperature, causing the bursting capsule 14 to rupture.

The conductive element 34 has an electrical resistance. As referred to herein, the electrical resistance of the conductive element 34 is measured with a Keithley DMM7510 digital multimeter using a 4-wire resistance measurement technique. In some embodiments, the electrical resistance can range between about 1Ω and about 50Ω. In some embodiments, the electrical resistance of the conductive element 34 can be no more than about 20Ω, no more than about 10Ω, no more than about 5Ω, no more than about 3.5Ω, or no more than about 2Ω. In embodiments in which the rupturing fluid in the hollow cavity 30 is to be heated by the conductive element 34, the response time can be a function of the resistance of the conductive element 34. In some embodiments, the conductive element 34 is suitably formed in a continuous path on the vessel wall from a conductive metal, such as silver, copper, gold, aluminum, zinc, nickel, iron and related alloys, e.g., brass alloys, aluminum alloys or various iron alloys. Commonly, the conductive element 34 may include aluminum or an aluminum alloy.

Where the bursting capsule 14 is designed to be actuated by passage of an electrical current through the conductive element 34 disposed on the vessel wall, it is commonly desirable for the bursting capsule 14 to have an electrical actuation response time of no more than about 10 seconds as determined using a constant current source of 1.0 amp. For some embodiments, it may be advantageous to have a faster electrical actuation response time, such as an electrical actuation response time of no more than about 5 seconds, no more than about 3 seconds, no more than about 2 seconds or no more than about 1 second.

The conformal coating 38 is formed on an exterior surface of the wall 26 and the conductive element 34. In the illustrated embodiment, the conformal coating 38 covers a central portion of the bursting capsule 14 but does not cover the ends 42, 46. In other embodiments, the conformal coating 38 can cover more or less of the exterior surface of the wall 26 so long as the conformal coating 38 substantially covers the conductive element 34, forming a contiguous coating on the conductive element 34 and the contact points 66, 70. In some embodiments, the conformal coating 38 can overlie only the conductive element 34 and optionally a portion of the exterior surface of the wall 26 that is proximate the conductive element 34. In some embodiments, the conformal coating 38 completely encapsulates the conductive element 34 and the contact points 66, 70. As used herein, the phrase “completely encapsulates” means that the conformal coating 38 forms a fluid-tight seal around the conductive element 34 and the contact points 66, 70 such that the conductive element 34 and the contact points are not exposed to the air conditions of the area surrounding and adjacent to the sprinkler head 10 and the bursting capsule 14.

In other embodiments, the conformal coating 38 can overlie the conductive element 34, the contact points 66, 70, and substantially an entire exterior surface of the bursting capsule 14 and the sprinkler head. In such an embodiment, the phrase “exterior surface” is used to refer to portions of the sprinkler head 10 and the bursting capsule 14 that are exposed to the air conditions of the area being treated by the sprinkler head 10 and the bursting capsule 14 when the sprinkler head 10 and the bursting capsule 14 are engaged with a sprinkler system. Commonly, the conformal coating 38 completely encapsulates the exterior surfaces of the sprinkler head 10 and the bursting capsule 14. As illustrated in FIG. 1, the conformal coating 38 can have a thickness T of between substantially 25 μm through substantially 750 μm. In some embodiments, the conformal coating 38 can have a thickness T of between substantially 100 μm and substantially 500 μm. The conformal coating 38 is thermally conductive (e.g., allows heat to pass) so that the heat from environment can pass through the conformal coating 38 to heat the rupturing fluid received in the hollow cavity 30. The conformal coating can be frangible or flexible such that the bursting capsule 14 falls away from the release valve 18 of the sprinkler head 10 after the bursting capsule 14 breaks.

In some embodiments, the conformal coating 38 comprises one or more of a silicone-based polymer, an acrylic polymer, a polyurethane polymer, an epoxy polymer, a polyester polymer, an oil modified polyurethane polymer, a polyester urethane polymer, a parylene polymer, a fluoropolymer, or a combination thereof. When conformal coating 38 comprises two or more of such types of polymers, the differing polymer types may be present in a single layer as a polymer blend or may be present as two or more layers, with each layer being comprised of a distinct polymer type. In some embodiments, the conformal coating 38 can be an acrylated silicone polymer. In some embodiments, the conformal coating is an oil modified polyurethane polymer. In some embodiments, the conformal coating may advantageously be formed solely from a modified polyurethane polymers such as HumiSeal 1A27 Aerosol polyurethane conformal coating or HumiSeal 1A33 Aerosol conformal coating.

In some embodiments, the conformal coating 38 can be applied to the bursting capsule 14 as an aerosol spray, e.g., by applying a prepolymer as an aerosol spray. The phrase “prepolymer” refers to a compound that can be applied to the bursting capsule 14 and that, when cured, forms the conformal coating 38 of the polymers described herein. In some instances, the prepolymer may include oligomeric and/or polymeric molecules, which are capable of being reacted to form higher molecular weight structures and/or cross-linked structures. The curing step made be accomplished by a variety of well-known procedures, e.g., by heating, moisture cure and/irradiation. In other embodiments, the conformal coating 38 may be applied by dip/immersion coating, and/or be applied by selectively coating of portions of the bursting capsule 14, e.g., via application with a brush, roller or other similar application device. Advantageously, in some embodiments, the conformal coating 38 can be applied to the bursting capsule 14 after the bursting capsule 14 has been coupled to the sprinkler head 10. In such an arrangement, the conformal coating 38 forms a contiguous coating over the conductive element 34, the contact points 66, 70, the bursting capsule 14, and the sprinkler head 10 and extends into any gaps or exposed contact points 66, 70 that exist between the sprinkler head 10 and the bursting capsule 14.

Quite commonly, it may be advantageous to apply the conformal coating 38 to the bursting capsule 14 by applying a prepolymer via an aerosol application. In a particular embodiment, the conformal coating 38 can be formed from a polyurethane polymer that can be cured by exposure to heat at a temperature below the predetermined trigger temperature of the bursting capsule 14 for at least substantially 24 hours. In some embodiments, the polyurethane polymer is an oil modified polyurethane polymer that can be cured by exposure to heat at a temperature below the predetermined trigger temperature for substantially two weeks. In some embodiments, the conformal coating 38 can be a silicone polymer that can be cured by exposure to air for at least substantially 24 hours. In other embodiments, the conformal coating 38 can be formed from a polymer that can be cured (by exposure to air for at least substantially 24 hours or via UV radiation cure.

Figure 2:
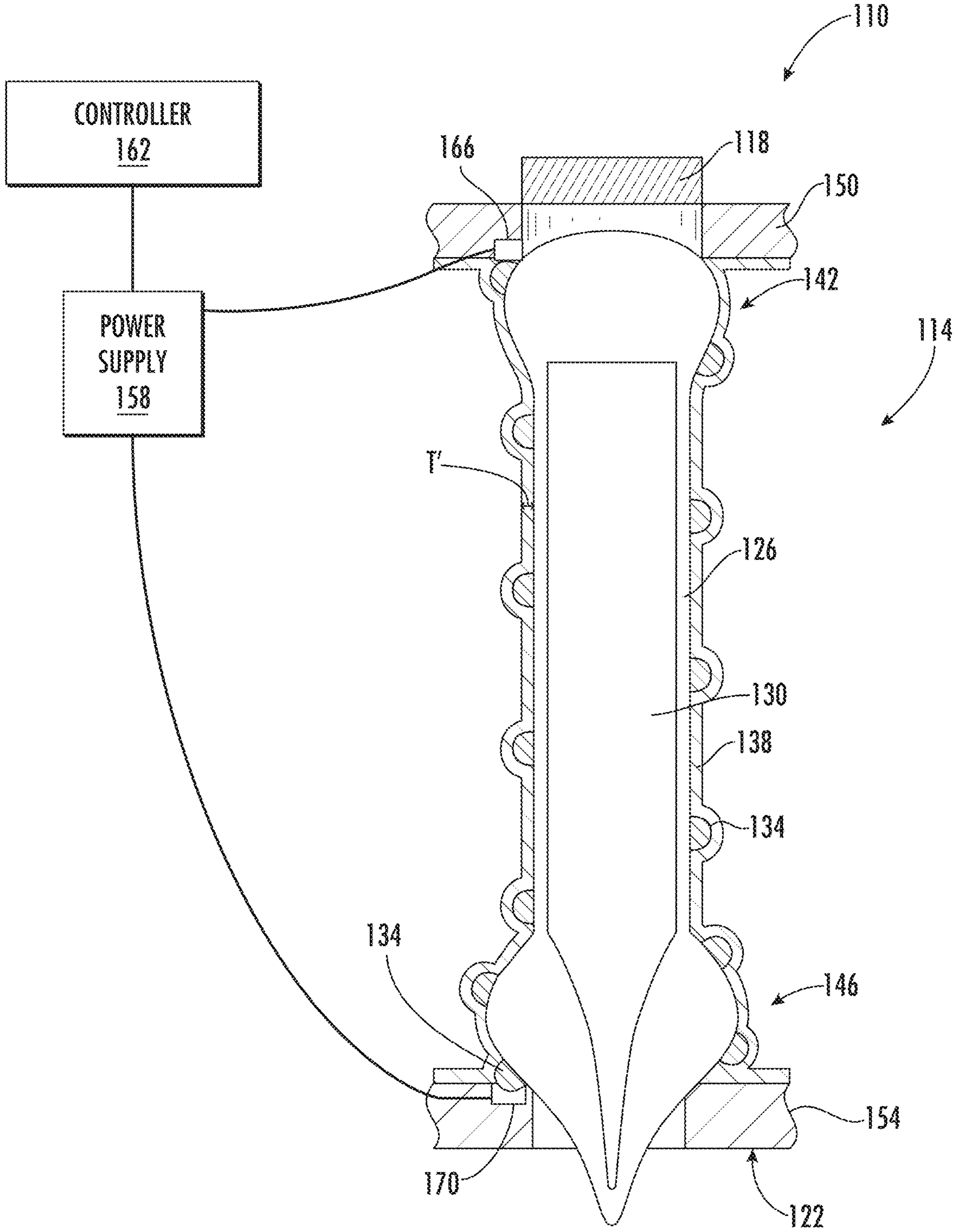
FIG. 2 illustrates a bursting capsule having a conformal coating, according to another example embodiment.

FIG. 2 illustrates a sprinkler head 110 including a bursting capsule 114. The sprinkler head 110 and the bursting capsule 114 are substantially similar to the sprinkler head 10 and the bursting capsule 14 described with respect to FIG. 1. Like parts between the sprinkler head 10 and the bursting capsule 14 and the sprinkler head 110 and the bursting capsule 114 have similar numbering, with the numeral “1” appended between the corresponding parts on the sprinkler head 110 and the bursting capsule 114. The sprinkler head 110 and the bursting capsule 114 is described herein as it differs from the sprinkler head 10 and the bursting capsule 14.

As illustrated in FIG. 2, the conductive element 134 is wound over a surface of the bursting capsule 114. In some embodiments, the conductive element 134 is suitably formed in a continuous path on the vessel wall 126 from a conductive metal. The conductive metal is described above with respect to the conductive element 34. In some embodiments, the conductive path on the vessel wall 126 is substantially helical. In some embodiments, the conductive path on the vessel wall 126 includes substantially parallel rows of the conductive material connected by curved portions of conductive metal. The conformal coating 138 has a thickness T' that is substantially similar to the thickness T described above with respect to the conformal coating 38.

The conformal coating 138 is formed on an exterior surface of the wall 126, the conductive element 134, and the contact points 166, 170. More particularly, the conformal coating 138 forms a contiguous coating over the conductive element 134 and the contact points 166, 170. Commonly, as illustrated in FIG. 2, the conformal coating 138 forms a contiguous coating over the conductive element 124, the contact points 166, 170, the exposed surfaces of the bursting capsule 114, and the exposed surfaces of the sprinkler head 110.

Figure 3:
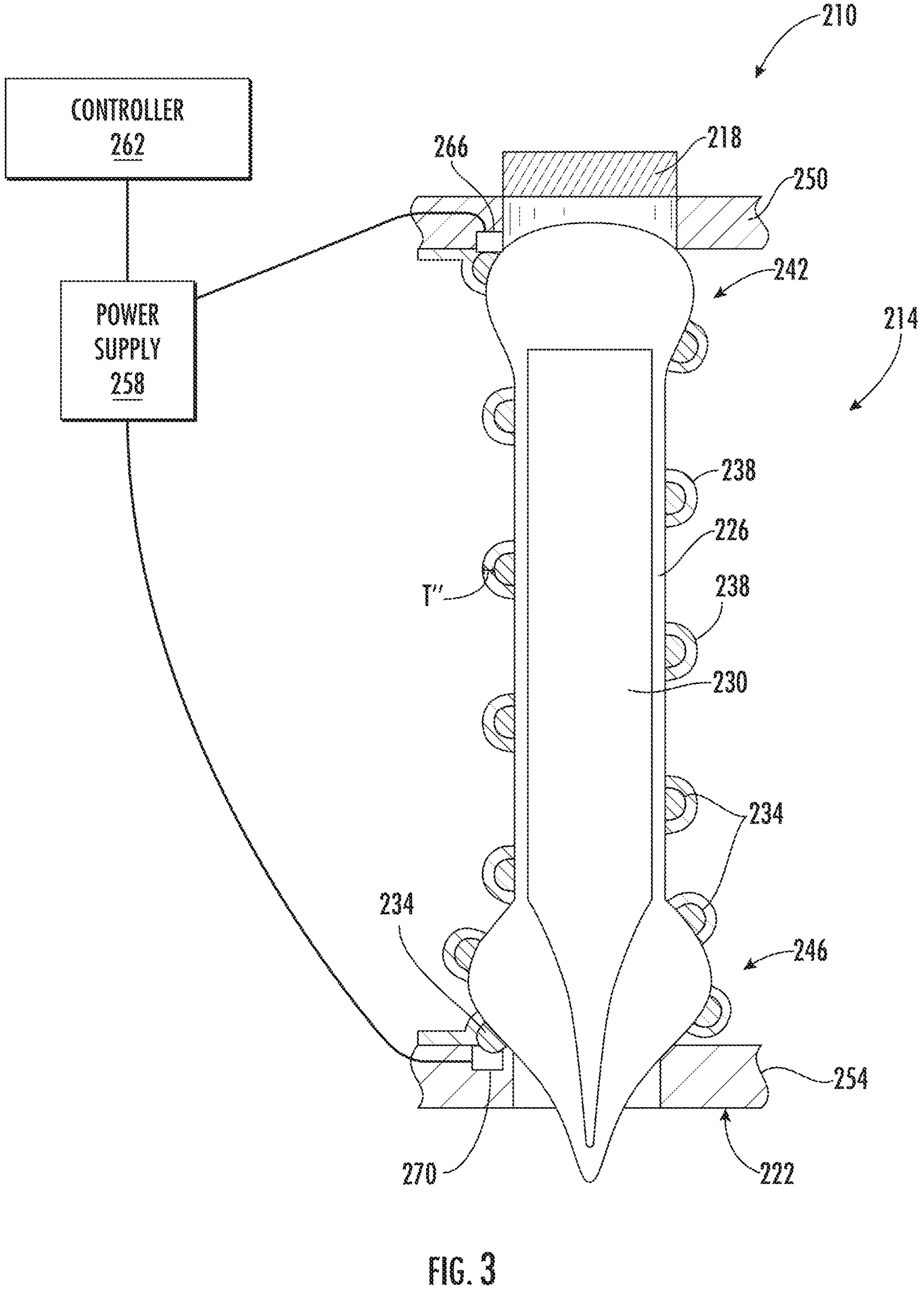
FIG. 3 illustrates a bursting capsule having a conformal coating, according to another example embodiment.

FIG. 3 illustrates a sprinkler head 210 including a bursting capsule 214. The sprinkler head 210 and the bursting capsule 214 are substantially similar to the sprinkler head 10 and the bursting capsule 14 described with respect to FIG. 1. Like parts between the sprinkler head 10 and the bursting capsule 14 and the sprinkler head 210 and the bursting capsule 214 have similar numbering, with the numeral "2" appended between the corresponding parts on the sprinkler head 210 and the bursting capsule 214. The sprinkler head 210 and the bursting capsule 214 is described herein as it differs from the sprinkler head 10 and the bursting capsule 14.

As illustrated in FIG. 2, the conductive element 234 is wound over a surface of the bursting capsule 214. In some embodiments, the conductive element 234 is suitably formed in a continuous path on the vessel wall 226 from a conductive metal. The conductive metal is described above with respect to the conductive element 34. In some embodiments, the conductive path on the vessel wall 226 is substantially helical. In some embodiments, the conductive path on the vessel wall 226 includes substantially parallel rows of the conductive material connected by curved portions of conductive metal. The conformal coating 238 has a thickness T" that is substantially similar to the thickness T described above with respect to the conformal coating 38.

The conformal coating 238 is formed on an exterior surface of the wall 226, the conductive element 234, and the connecting portions 266, 270. More particularly, the conformal coating 238 forms a contiguous coating over the conductive element 234 and the connecting portions 266, 270. Commonly, as illustrated in FIG. 3, the conformal coating 238 forms a contiguous coating over the conductive element 224, the connecting portions 266, 270, and portions of exposed surfaces of the sprinkler head 210 that are adjacent the connecting portions 266, 270. The conformal coating 238 does not extend over the exposed surfaces of the bursting capsule 114, and the exposed surfaces of the sprinkler head 110 that are not adjacent to and/or coupled to the conductive element 234 or the connecting portions 266, 270.

Illustrative Method of Manufacturing Sprinkler Head with Conformal Coating

Figure 4:
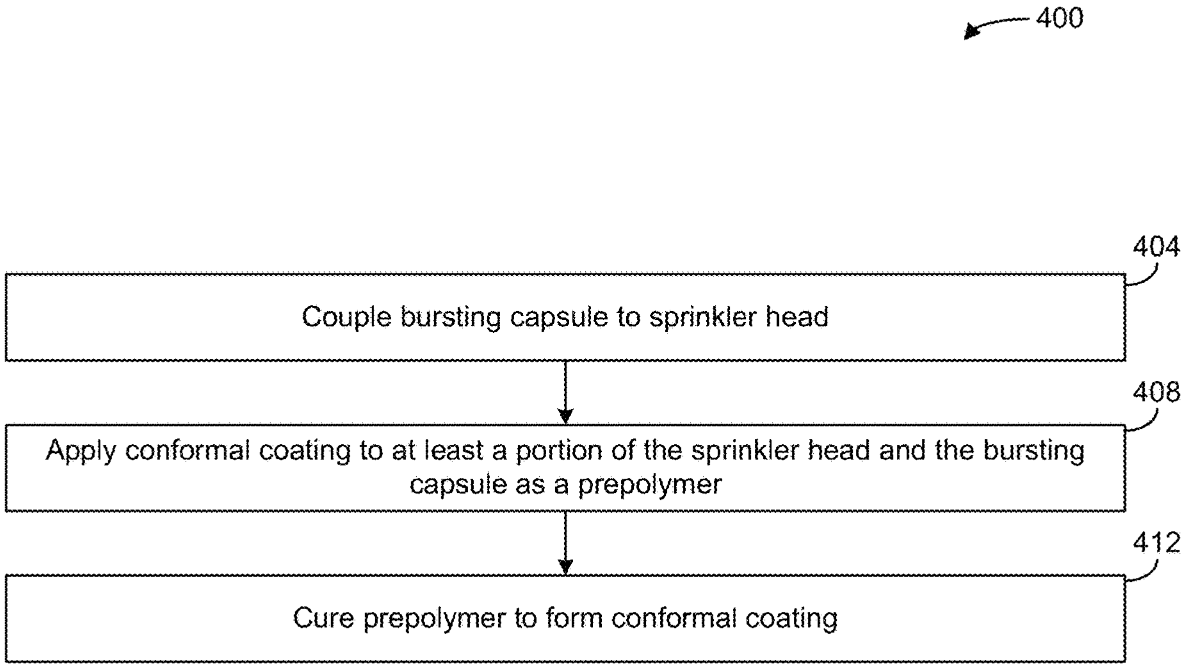
FIG. 4 illustrates a method for manufacturing a sprinkler head according to an example embodiment.

FIG. 4 illustrates a method for manufacturing a sprinkler head 10 according to some embodiments. At 404, the bursting capsule 14 is coupled to the sprinkler head 10 such that the conductive element 34 of the bursting capsule 14 forms an electrical connection with the contact points 66, 70 in the sprinkler head 10. At 408, the conformal coating 38 is applied to at least a portion of the sprinkler head 10 and the bursting capsule 14 as a prepolymer to form a contiguous coating between the conductive element 34 and the contact points 66, 70. In some embodiments, the conformal coating 38 is applied as a prepolymer in an aerosol formulation, is dip-coated, or is brushed onto the conductive element 34 and the contact points 66, 70. In some embodiments, the conformal coating 38 completely encapsulates the conductive element 34 and the contact points 66, 70. In some embodiments, the conformal coating completely encapsulates the exterior surfaces of the sprinkler head 10 and the bursting capsule 14. Commonly, the conformal coating 38 is applied to the conductive element 34 and the contact points 66, 70 as a prepolymer in an aerosol formulation. The conformal coating 38 has an average thickness of about 25 μm to 750 μm, typically about 100 μm to 500 μm. In some embodiments, the conformal coating 38 includes a polyurethane polymer. More particularly, in some embodiments, the conformal coating 38 includes an oil modified polyurethane polymer and/or a polyester polyurethane polymer. At 412, the prepolymer is air-cured, heat-cured, or UV-cured to form the conformal coating 38. In some instances, the prepolymer is heat cured at a temperature below the trigger temperature of the bursting capsule 14 for at least 24 hours. Commonly, the prepolymer is heat cured for two weeks at a temperature below the trigger temperature of the bursting capsule 14.

Although the method is described with respect to the conformal coating 38, the sprinkler head 10 and the bursting capsule 14, the conformal coatings 138, 238 can be applied to the sprinkler heads 110, 210 and the bursting capsules 114, 214 in a similar manner.

Corrosion Resistance

The sprinkler head 10 and the bursting capsule 14 can be used in automatic sprinkler systems for fire protection systems such as automatic sprinkler systems. Accordingly, the sprinkler head 10 and the bursting capsule 14 must meet the Underwriters Laboratories ("UL") 199 Standard, the entire contents of which are incorporated by reference herein. The thickness T of the conformal coating 38 is sized so that the bursting capsule 14 can withstand an exposure to a 20% salt spray, hydrogen sulfide, and/or carbon dioxide-sulfur dioxide atmospheres over ten day testing periods. More specifically, the thickness T is configured to protect the conductive element 34 from corrosion during the UL 199 10-day corrosion test conditions. For example, the electrical resistance of the bursting capsule 14 is not increased by more than a factor of 1.3, two, five, or ten after exposure to a moist hydrogen sulfide-air mixture pursuant to UL 199 10-day corrosion test conditions. The electrical resistance of the bursting capsule 14 is not increased by more than a factor of 1.3, two, five, or ten after exposure to a 20% salt spray pursuant to UL 199 10-day corrosion test conditions. The electrical resistance of the bursting capsule 14 is not increased by more than a factor of 1.3, two, five, or ten after exposure to a carbon dioxide-sulfur dioxide atmosphere pursuant to UL 199 10-day corrosion test conditions.

As discussed above, the rupturing fluid received in the hollow cavity 30 has a predetermined response time at a predetermined trigger temperature. After exposure to a moist hydrogen sulfide-air mixture pursuant to UL 199 10-day corrosion test conditions, the bursting capsule 14 has a response time at the predetermined trigger temperature which is not greater than about 1.3, two, five, or ten times the predetermined response time. After exposure to 20% salt spray pursuant to UL 199 10-day corrosion test conditions, the bursting capsule 14 has a response time at the predetermined trigger temperature which is not greater than about 1.3, two, five, or ten times the predetermined response time. After exposure to a carbon dioxide-sulfur dioxide atmosphere pursuant to UL 199 10-day corrosion test conditions, the bursting capsule has a response time at the predetermined trigger temperature which is not greater than about 1.3, two, five, or ten times the predetermined response time.

Table I summarizes the results of an exemplary corrosion test. In the exemplary corrosion test, five samples of ten bursting capsules 14 were coupled to ten sprinkler heads 10. The first sample was uncoated. The second sample was coated with the polyurethane conformal coating HumiSeal 1A27. The third sample was coated with the polyurethane conformal coating HumiSeal 1A33. The fourth sample was coated with an acrylic conformal coating HumiSeal 1B73. The fifth sample was coated with a silicone modified conformal coating MG Chemicals 422B. Each of the conformal coatings used in samples 2-4 were applied as a prepolymer in an aerosol spray and heat cured for two weeks at a temperature below 68° C. The initial resistances were measured for the conductive elements of each of the bursting capsules in each sample. The average initial resistance of the conductive element for each sample is illustrated below in Table 1. The four samples were then subjected to a moist hydrogen sulfide-air mixture pursuant to the UL 199 10-day corrosion test. At the end of the 10 day test period, the final resistances of the conductive elements were measured for each of the bursting capsules in each sample. The average final resistance of the conductive elements of the bursting capsules for each sample is illustrated below in Table 1.

TABLE 1

UL 199 10 Day Moist Hydrogen Sulfide Corrosion Test Results

| Sample | Coating | Initial Resistance | Final Resistance |
|---|---|---|---|
| 1 | Uncoated | 3.3 Ω | $1.2 \times 10^6$ Ω |
| 2 | Polyurethane Coating (HumiSeal 1A27) | 3.2 Ω | 3.5 Ω |
| 3 | Polyurethane Coating (HumiSeal 1A33) | 3.3 Ω | 3.3 Ω |
| 4 | Acrylic Coating (HumiSeal 1B73) | 3.8 Ω | $0.95 \times 10^6$ Ω |
| 5 | Silicone Coating (MG Chemicals 422B) | 3.3 Ω | $0.93 \times 10^6$ Ω |

As illustrated in Table 1, both of the polyurethane coatings protected the conductive element from the moist hydrogen sulfide-air mixture. For example, the conductive elements of the bursting capsules in Sample 2 (polyurethane conformal coating Humiseal 1A27) experienced a 9% increase in resistance (e.g., the electrical resistance is increased by less than a 1.1 multiple) after the UL 199 10 day moist hydrogen sulfide test corrosion test. The conductive elements of the bursting capsules of sample 3 (polyurethane conformal coating HumiSeal 1A33) experienced a 0% increase in resistance after the UL 199 10 day moist hydrogen sulfide test corrosion test. In contrast, both the conductive elements of the bursting capsules in Sample 1 (uncoated), Sample 4 (acrylic coating HumiSeal 1B73), and Sample 5 (silicone coating MG Chemicals 422B) experienced an increase in resistance by approximately one million ohms after the UL 199 10 day moist hydrogen sulfide test corrosion test. Therefore, both of the polyurethane conformal coating Humiseal 1A27 and the polyurethane conformal coating HumiSeal 1A33 provide significant protection to the conductive elements of the bursting capsules during the UL 199 10 day moist hydrogen sulfide test corrosion test.

Accordingly, for the samples treated with the polyurethane conformal coating, the conductive elements have an electrical resistance, which is not increased by more than a ten (10) multiple, often by no more than a five (5) multiple, desirably by no more than a two (2) multiple and preferably by no more than a 1.3 multiple after exposure to a moist hydrogen sulfide-air mixture pursuant to UL 199 10-day corrosion test conditions.

Illustrative Embodiment

Para. 1. An exemplary bursting capsule includes a hollow cavity completely enclosed and delimited by a vessel wall comprising a frangible material, a rupturing fluid disposed in the hollow cavity, an electrical conductor disposed on an outside surface of the vessel wall, and a conformal coating on at least a portion of the outside surface covering the electrical conductor.

Para. 2. In some embodiments, the conformal coating of the bursting capsule of Para. 1. has an average thickness of about 25 μm to 750 μm.

Para. 3. In some embodiments, the conformal coating of the bursting capsule of Paras. 1 or 2 is configured to conduct heat.

Para. 4. In some embodiments, the conformal coating of the bursting capsule of any of Paras. 1-3 includes a polyurethane polymer.

Para. 5. In some embodiments, the polyurethane polymer of Para. 4 comprises polyester urethane polymer and/or oil-modified polyurethane polymer.

Para. 6. In some embodiments, the bursting capsule of any of Paras. 1-5 is a glass bulb.

Para. 7. In some embodiments, the bursting capsule of any of Paras. 1-6 has a predetermined trigger temperature in a range from 50 to 275° C.

Para. 8. In some embodiments, the bursting capsule of any of Paras. 1-7 has an electrical actuation response time of no more than about 10 seconds.

Para. 9. In some embodiments, the electrical conductor of the bursting capsule of any of Paras. 1-8 has an electrical resistance of no more than about 5 ohms.

Para. 10. In some embodiments, the electrical conductor of the bursting capsule of any of Paras. 1-9 has an electrical resistance, which is increased by no more than a five (5) multiple after exposure to a moist hydrogen sulfide-air mixture pursuant to UL 199 10-day corrosion test conditions.

Para. 11. In some embodiments, the bursting capsule of any of Paras. 1-10 has an initial predetermined response time at a predetermined trigger temperature; and after exposure to a moist hydrogen sulfide-air mixture pursuant to UL 199 10-day corrosion test conditions, the bursting capsule has a response time at the predetermined trigger temperature which is not greater than about ten (10) times the initial predetermined response time.

Para. 12. In some embodiments, the rupturing fluid of the bursting capsule of any of Paras. 1-11 is configured to rupture the vessel wall after the bursting capsule has been at the predetermined trigger temperature for a predetermined response time of no more than about 210 seconds, often no more than about 180 seconds, preferably no more than about 140 seconds, preferably no more than about 30 seconds.

Para. 13. In some embodiments, the conformal coating of any of Paras. 1-12 is formed by a process comprising application of a prepolymer as an aerosol formulation; and curing the applied prepolymer to form the conformal coating.

Para. 14. In some embodiments, the conformal coating of the bursting capsule of any of Paras. 1-13 covers substantially the entire outside surface of the vessel wall.

Para. 15. In some embodiments, the bursting capsule of any of Paras. 1-14 includes the rupturing liquid and a gas bubble disposed in the hollow cavity, the conformal polymer coating has an average thickness of about 100 μm to 500 μm, the frangible material comprises glass, and the electrical conductor has an electrical resistance of no more than about 5 ohms The bursting capsule has a predetermined trigger temperature in a range from 50 to 275° C. and an electrical actuation response time of no more than about 2 seconds.

Para. 16. In some embodiments, the conformal coating of the bursting capsule of Para. 15 includes polyurethane polymer.

Para. 17. In some embodiments, the polyurethane polymer of the bursting capsule of Para. 16 includes an oil-modified polyurethane polymer.

Para. 18. In some embodiments, a fire protection device includes the bursting capsule of any of Paras. 1-17.

Para. 19. In some embodiments, a fire protection system includes at least one sprinkler head, which includes the bursting capsule of any of Paras. 1-18.

Para. 20. In some embodiments, each sprinkler head of the fire protection system of Para. 19 includes first and second electrical contact points in electrical contact with the electrical conductor disposed on the bursting capsule vessel wall, and the conformal coating is a contiguous coating completely encapsulating the conductive element and the first and second electrical contact points.

Para. 21. In some embodiments, the conformal coating of on each bursting capsule of the fire protection system of Para. 20 covers substantially the entire outside surface of the vessel wall.

Para. 22. In some embodiments, a method for manufacturing a sprinkler head includes coupling the bursting capsule of any of Paras. 1-16 to a sprinkler head housing including a first electrical contact point and a second electrical contact point, such that an electrical connection is formed between the conductive element on the bursting capsule and the first and second electrical contact points. Applying a conformal coating to at least a portion of the sprinkler head housing and the bursting capsule to form a contiguous coating completely encapsulating the conductive element and the first and second electrical contact points.

Para. 23. In some embodiments, the applying step of the method of Para. 22 includes applying the conformal coating comprises application of a prepolymer as an aerosol formulation; and curing the applied prepolymer to form the conformal coating.

Para. 24. In some embodiments, the conformal coating described in the method of Para. 22 or 23 has an average thickness of about 25 μm to 750 μm, typically about 100 μm to 500 μm.

Para. 25. In some embodiments, the conformal coating described in the method of any of Paras. 22-24 is configured to conduct heat.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

Those skilled in the art will appreciate that the description herein is illustrative only and is not intended to be in any way limiting. Other aspects, inventive features, and advantages of the devices and/or processes described herein will become apparent from the description set forth herein and taken in conjunction with the accompanying drawings.

What is claimed is:

1. A bursting capsule configured for use in a sprinkler head, the bursting capsule comprising a hollow cavity completely enclosed and delimited by a vessel wall comprising a frangible material; a rupturing fluid disposed in the hollow cavity; an electrical conductor disposed on the vessel wall; and a thermally conductive conformal coating covering at least a portion of the electrical conductor.

2. The bursting capsule of claim 1, wherein the conformal coating has an average thickness of about 25 μm to 750 μm.

3. The bursting capsule of claim 1, wherein the conformal coating comprises a polyurethane polymer.

4. The bursting capsule of claim 3, wherein the polyurethane polymer comprises polyester urethane polymer and/or oil-modified polyurethane polymer.

5. The bursting capsule of claim 1, wherein the bursting capsule has a predetermined trigger temperature in a range from 50 to 275° C.

6. The bursting capsule of claim 1, wherein the bursting capsule has an electrical actuation response time of no more than about 10 seconds.

7. The bursting capsule of claim 1, wherein the electrical conductor has an electrical resistance of no more than about 5 ohms.

8. The bursting capsule of claim 1, wherein the electrical conductor has an electrical resistance, which is increased by no more than a ten (10) multiple after exposure to a moist hydrogen sulfide-air mixture pursuant to UL 199 10-day corrosion test conditions.

9. The bursting capsule of claim 5, wherein the bursting capsule has an initial predetermined response time at the predetermined trigger temperature; and after exposure to a moist hydrogen sulfide-air mixture pursuant to UL 199 10-day corrosion test conditions, the bursting capsule has a response time at the predetermined trigger temperature which is not greater than about two (2) times the initial predetermined response time.

10. The bursting capsule of claim 5, wherein the rupturing fluid is configured to rupture the vessel wall after the bursting capsule has been at the predetermined trigger temperature for a predetermined response time of no more than about 30 seconds.

11. The bursting capsule of claim 1, wherein the conformal coating is formed by a process comprising application of a prepolymer as an aerosol formulation; and curing the applied prepolymer to form the conformal coating.

12. The bursting capsule of claim 1, comprising the rupturing fluid and a gas bubble disposed in the hollow cavity;

wherein:

the conformal coating has an average thickness of about 25 μm to 500 μm;

the frangible material comprises glass;

the electrical conductor has an electrical resistance of no more than about 5 ohms; and the bursting capsule has a predetermined trigger temperature in a range from 50 to 275° C. and an electrical actuation response time of no more than about 2 seconds.

13. The bursting capsule of claim 12, wherein the conformal coating comprises a polyurethane polymer.

14. A fire protection device comprising the bursting capsule of claim 1.

* * * * *